United States Patent
Hay (10) Patent No.: US 9,090,180 B2
(45) Date of Patent: Jul. 28, 2015

(54) AUTOMOTIVE FLOOR MAT ASSEMBLY

(71) Applicant: Gordon Hay, Ste-Anne-des-Plaines (CA)

(72) Inventor: Gordon Hay, Ste-Anne-des-Plaines (CA)

(*) Notice: Subject to any disclaimer, the term of this patent is extended or adjusted under 35 U.S.C. 154(b) by 0 days.

(21) Appl. No.: 14/383,797

(22) PCT Filed: Mar. 7, 2013

(86) PCT No.: PCT/CA2013/000206
§ 371 (c)(1),
(2) Date: Sep. 8, 2014

(87) PCT Pub. No.: WO2013/134850
PCT Pub. Date: Sep. 19, 2013

(65) Prior Publication Data
US 2015/0091324 A1    Apr. 2, 2015

Related U.S. Application Data

(60) Provisional application No. 61/608,025, filed on Mar. 7, 2012.

(51) Int. Cl.
*B60N 3/04* (2006.01)

(52) U.S. Cl.
CPC ............. *B60N 3/044* (2013.01); *B60N 3/048* (2013.01)

(58) Field of Classification Search
CPC .......... B60N 3/04; B60N 3/042; B60N 3/044; B60N 3/048
USPC ....................................... 296/97.23
See application file for complete search history.

(56) References Cited

U.S. PATENT DOCUMENTS

| | | | | |
|---|---|---|---|---|
| 2,650,855 A * | 9/1953 | Peirce | ........................ | 296/97.23 |
| 3,050,329 A * | 8/1962 | Pagan | ........................ | 296/97.23 |
| 3,149,875 A * | 9/1964 | Stata | ......................... | 296/97.23 |
| 3,284,836 A * | 11/1966 | Ioppolo | .......................... | 15/313 |
| 4,211,447 A | 7/1980 | Di Vincenzo | | |
| 4,406,492 A * | 9/1983 | Cackowski | ................. | 296/97.23 |
| 4,420,180 A * | 12/1983 | Dupont et al. | ............. | 296/97.23 |
| 4,765,670 A * | 8/1988 | Jackson | ...................... | 296/97.23 |
| 6,719,348 B1 * | 4/2004 | Song | ............................. | 296/39.1 |
| 8,663,782 B1 * | 3/2014 | Siegel et al. | .................. | 428/167 |
| 8,807,635 B2 * | 8/2014 | Taylor et al. | ............. | 296/193.07 |
| 8,839,812 B2 * | 9/2014 | Tanhehco et al. | ............. | 137/312 |
| 8,967,697 B1 * | 3/2015 | Yang | .......................... | 296/97.23 |

FOREIGN PATENT DOCUMENTS

| | | |
|---|---|---|
| WO | 2007/030103 | 3/2007 |
| WO | 2008/086563 | 7/2008 |

OTHER PUBLICATIONS

International Search Report of International Patent Application No. PCT/CA2013/000206.

* cited by examiner

*Primary Examiner* — Gregory Blankenship
(74) *Attorney, Agent, or Firm* — Bereskin & Parr LLP

(57) ABSTRACT

A floor mat assembly (A) comprises a floor mat (10) and an evacuation unit (14) including a pump (16) and a reservoir (18). The floor mat (10) defines a collecting area (36) and ribbing (28, 30) with channels (29, 32) therebetween, which channels (29, 32) are adapted to convey substances, such as water, slush, mud, etc., to the collecting area (36). The pump (16) is provided with an inlet conduit (38) having an entry end thereof located in the collecting area (36). The pump (16) is adapted to pump at least some of these substances out of the collecting area (36) and into the reservoir (18). The evacuation unit (14) is adapted to be removed from the floor mat (10). A decorative auxiliary mat (12) is also provided for positioning atop the floor mat (10).

14 Claims, 8 Drawing Sheets

AUTOMOTIVE FLOOR MAT ASSEMBLY

CROSS-REFERENCE TO RELATED APPLICATIONS

This application is a national phase entry of PCT/CA2013/000206, filed Mar. 7, 2013, which claims priority from U.S. Provisional patent application Ser. No. 61/608,025 filed Mar. 7, 2012; each of these applications being incorporated herein in their entirety by reference.

FIELD OF THE INVENTION

The present invention relates to motor vehicles and, more particularly, to floor mats used therein for collecting water and other substances dripping from or coming off the footwear of the occupants of the vehicle, for instance the driver thereof.

BACKGROUND OF THE INVENTION

It is well known that drivers and passengers track various substances, for instance water, snow, slush (watery snow that sometimes carries salt), mud, etc., into vehicles on their footwear. Such drivers and passengers may herein be referred to as occupants of the vehicles. This occurs generally when the occupants were out in the rain or snow before boarding the vehicle. Then, while the driver and passengers are lodged in the vehicle, some of these substances come off from the footwear and fall on the vehicle's floor, which typically includes carpeting. The substances accumulate on the floor and, in the case of snow, it melts thereon. These wet substances all too often contribute to the staining of and possible damage to pant cuffs and/or long dresses and coats.

It is also well known that floor mats are provided onto the vehicle's floor as a means of protection for the carpeting as well as the underlying structural metal floor against harmful corrosion due to saturation from the accumulated salt laden water. There are a variety of floor mats currently available on the market, which attempt to deal with the problem of water accumulation and garment protection through the use of ribbing. As a result of using ribbing, channels are created, which receive and store therein the aforementioned substances, while the ribbing prevents dragging garments from coming into contact with the substances accumulated in the floor mat's channels. However, the volumetric capacity of these channels is limited and when combined with vehicular movements, e.g. sharp turns, the substances can and do overflow the ribbing. In addition to overflow, when the water is too close to the upper edges of the ribbing absorption by the occupants' garments is possible, for example by capillarity.

There are a number of patents which have proposed solutions to this problem, such as U.S. Pat. No. 4,765,670 which issued on Aug. 23, 1988 to Jackson and which discloses a drainage mat for automobile floors. Sloping grooves or troughs are defined in the drainage mat such as to direct fluid dripping from the footwear of the automobile's occupants into a collecting trough provided at the rear of the mat. The collected fluid is drawn off into a closed storage tank connected to the drainage mat by a flexible tube. The tube can be disconnected so that the storage tank can be removed from the drainage mat and be subsequently emptied of the collected fluid, and thereafter reconnected to the drainage mat.

There is thus still a need for an improved floor mat for motor vehicles, which collects substances and keeps them away from the garments of the vehicles' occupants.

SUMMARY OF THE INVENTION

It is therefore an aim of the present invention to provide a novel floor mat assembly for motor vehicles.

Therefore, in accordance with the present invention, there is provided a floor mat assembly, comprising a floor mat and an evacuation unit, said floor mat being adapted to collect liquid-based substances, and said evacuation unit being adapted to pump at least some of the substances out of said floor mat.

Also in accordance with the present invention, there is provided a floor mat assembly, comprising a floor mat and an auxiliary mat, said floor mat being adapted to collect liquid-based substances, and said auxiliary mat being adapted to be positioned atop said floor mat and to allow substances to pass therethrough and onto said floor mat.

Further in accordance with the present invention, there is provided a floor mat assembly, comprising a floor mat and a pump, said floor mat being adapted to collect liquid-based substances, and said pump being adapted when actuated to pump at least some of the substances out of said floor mat.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

Reference will now be made to the accompanying drawings, showing by way of illustration an illustrative embodiment of the present invention, and in which.

DESCRIPTION OF ILLUSTRATIVE EMBODIMENTS OF THE INVENTION

With reference to the drawings, there will now be described an automotive floor mat assembly A for use in motor vehicles.

Figures 1, 2, 3:
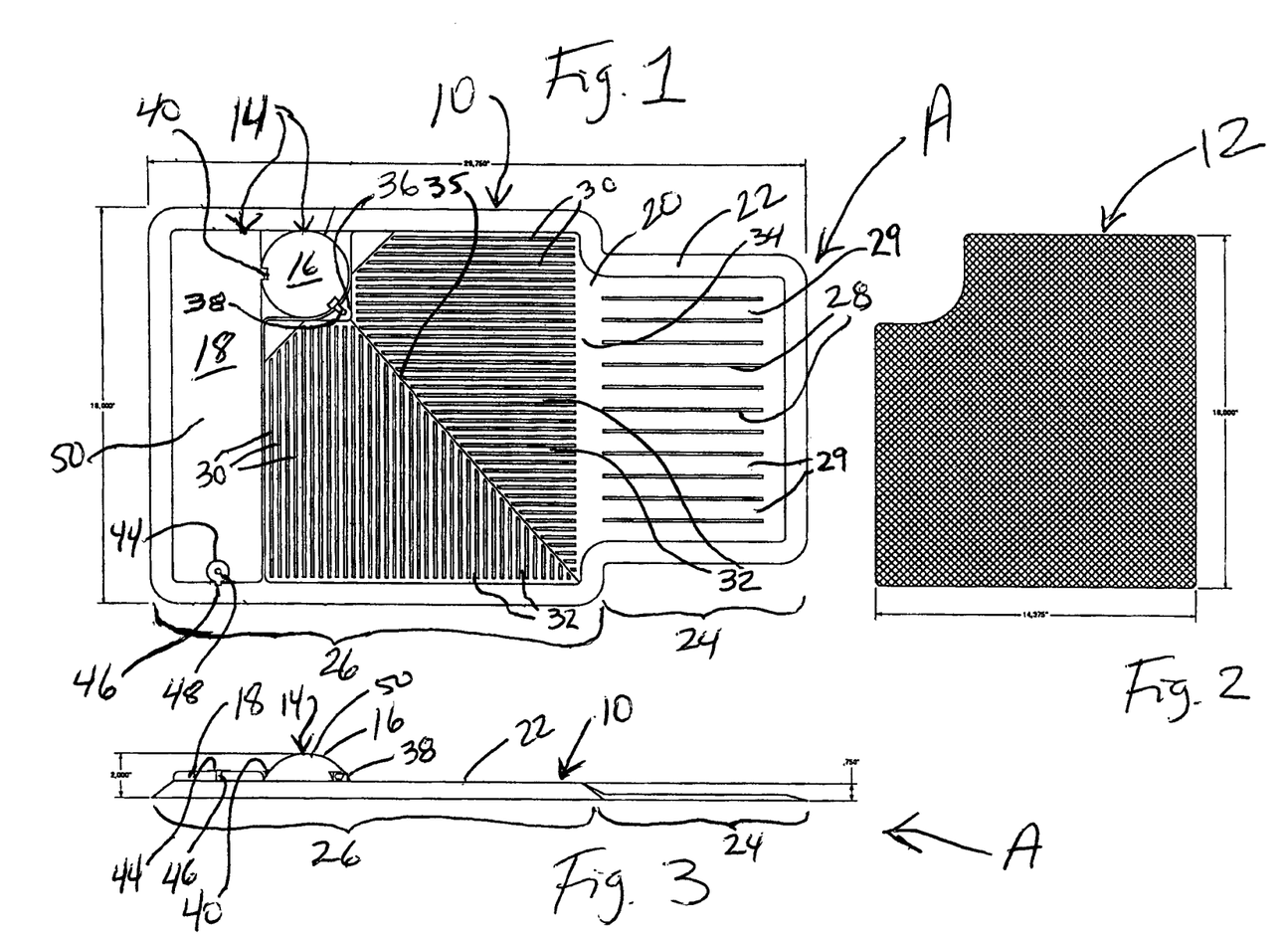
FIG. 1 is a top plan view of an automotive floor mat assembly in accordance with a first embodiment of the present invention.
FIG. 2 is a top plan view of a decorative mat for use with the floor mat assembly of FIG. 1.
FIG. 3 is a side elevation view of the floor mat assembly of FIG. 1.

More particularly, and with specific reference to FIGS. 1 to 3, the floor mat assembly A includes a floor mat 10, a decorative auxiliary mat 12 (FIG. 2) and an evacuation unit 14, which includes a pump 16 and a reservoir 18. Basically, the floor mat 10 herein uses ribbing to direct and collect liquid-based substances and particulates from melted snow tracked into the vehicle on the footwear of the driver and passengers, particularly during winter conditions. Using the pump 16, the collected liquid-based substances and particulates are then evacuated into the reservoir 18 for subsequent disposal thereafter. By removing the liquid-based substances and particulates collected by the floor mat assembly A, not only are the occupant's garments protected but unhealthy odours from mould and mildew are reduced as well as the problem of 'fogged-up' windows associated with the evaporation via the vehicle's interior heating system.

The expression "water and particulates" will be hereinafter used, and is intended to cover the various liquids and solids that may be collected by the floor mat assembly A and then pumped therefrom. Although water is expected to be the principal liquid collected when the floor mat assembly A is used in vehicles, other liquids can also be collected by the floor mat assembly A when used in areas other than vehicles. It can therefore be said that the present floor mat assembly A is generally capable of collecting liquid-based substances.

The floor mat 10, which is typically made of rubber, includes a bottom wall 20 and a peripheral raised edge 22 and defines merging front and rear sections 24 and 26 respectively. When the floor mat 10 is positioned on the floor of the vehicle, for example in the driver's area, the front section 24 extends forward and at an upward angle from the rear section 26, so as to lay under the vehicle's pedals (i.e. the gas pedal/throttle, the brake pedal and/or the clutch pedal for manual transmissions). The rear section 26 generally extends substantially horizontally under the driver's legs and rearwardly up to, and sometimes slightly under, the seat.

Figures 4, 6, 7, 8:
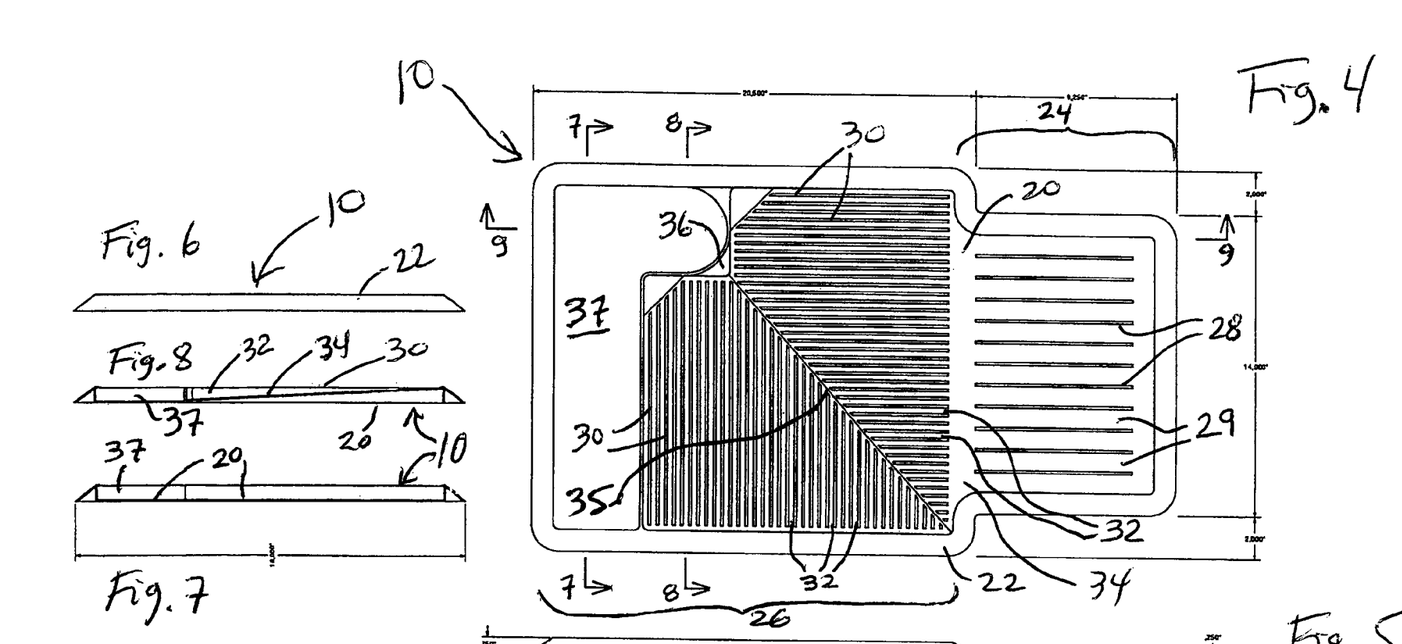
FIG. 4 is a top plan view of a floor mat of the floor mat assembly of FIG. 1.
FIG. 6 is a rear elevation view of the floor mat of FIG. 4.
FIGS. 7 and 8 are vertical cross-sectional views taken respectively along lines 7-7 and 8-8 in FIG. 4 and transversally of the floor mat of FIG. 4.
Figures 5, 9:
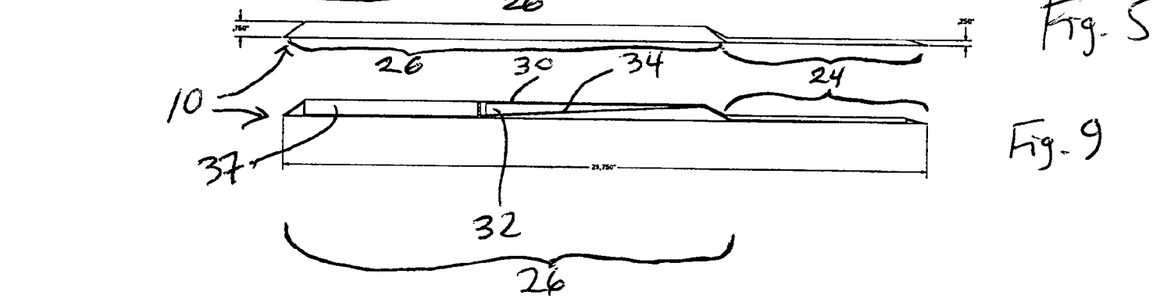
FIG. 5 is a side elevation view of the floor mat of FIG. 4.
FIG. 9 is a vertical cross-sectional view taken along line 9-9 in FIG. 4 and longitudinally of the floor mat of FIG. 4.
Figure 10:
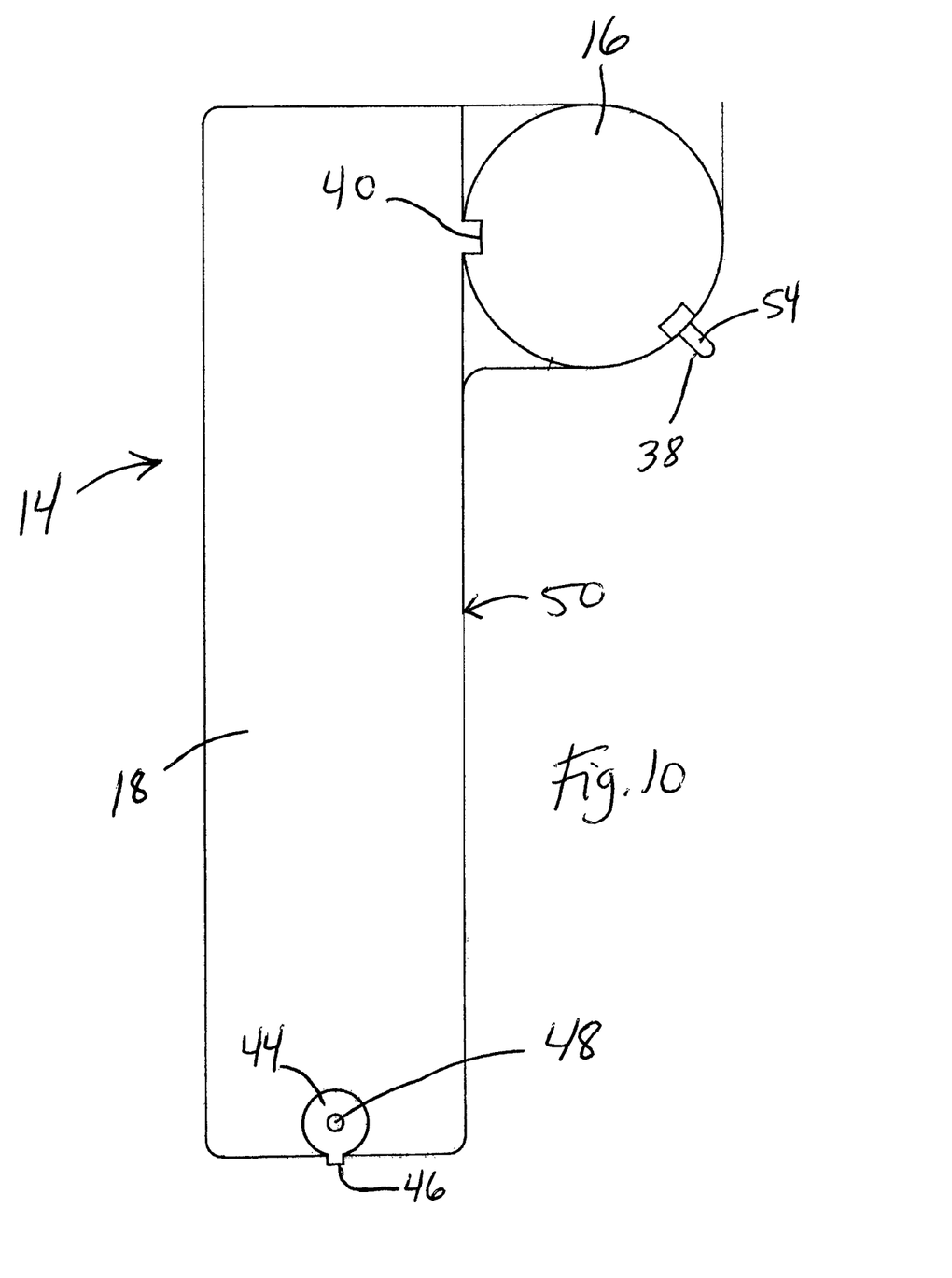
FIG. 10 is a top plan view of an evacuation unit of the floor mat assembly of FIG. 1.
Figure 11:
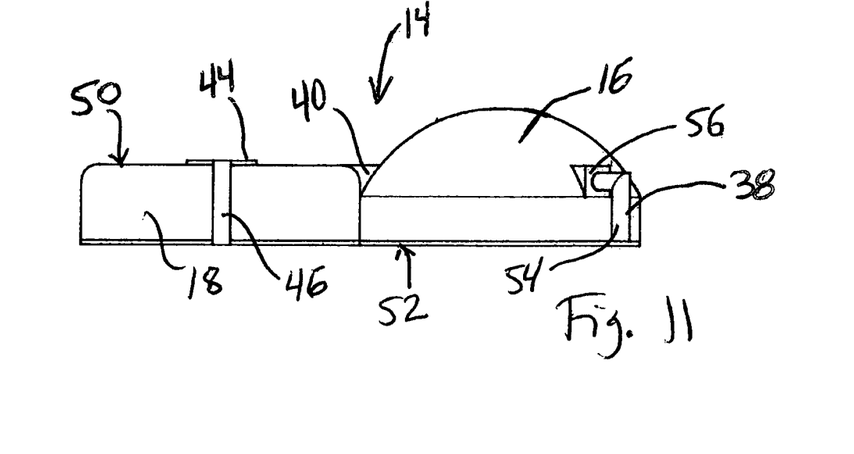
FIG. 11 is a side elevation view of the evacuation unit of FIG. 10.

As seen in FIG. 1, the front section 24 is provided with raised ribs 28 that define therebetween a number of channels 29, for directing water and particulates towards the rear section 26. The rear section 26 defines a series of raised ribs 30 with channels 32 therebetween, the ribs 30 extending upward from an upper surface 34 of the bottom wall 20 of the floor mat 10. As seen in FIG. 9, the upper surface 34 of the bottom wall 20 slopes slightly downwardly towards the pump 16. Accordingly, the height of the ribs 30 varies so that upper edges of the ribs 32 are coplanar. As seen in FIGS. 1 and 4, the ribs 30 and related channels 32 are disposed in two sections, one longitudinal and one transversal, which meet at a diagonal trough 35. The upper surface 34 of each of these two ribbed sections is sloped towards the trough 35, whereby water and particulates collected by the channels 32 of the ribbed sections are directed by the sloped upper surface 34 towards the trough 35.

The channels 32 are thus adapted to collect water and particulates having fallen onto the floor mat 10, including that received by the front section 24. The slope of the upper surface 34 ensures that the channels 32 and the trough 35 convey the water and particulates being collected towards a single area, identified by reference numeral 36 in FIG. 1 and hereinafter referred to as the collecting area 36.

The auxiliary mat 12 (see FIG. 2) is designed to be fittingly positioned atop the area of the rear section 26 of the floor mat 10, which defines the ribs 30, but typically not above the evacuation unit 14. The auxiliary mat 12 can take the form of a fine mesh of varying degree for allowing water and particulates to reach the floor mat 10 and, more particularly, the channels 32. The auxiliary mat 12 has the function of concealing part of the floor mat 10 and the water and particulates collected therein and of also supporting cuffs of pants and the like at a distance above the floor mat 10. The auxiliary mat 12 would be provided with raised and curved peripheral edges to prevent snow, water, mud and other particulates from falling on the sides of the floor mat assembly A.

Figure 12:
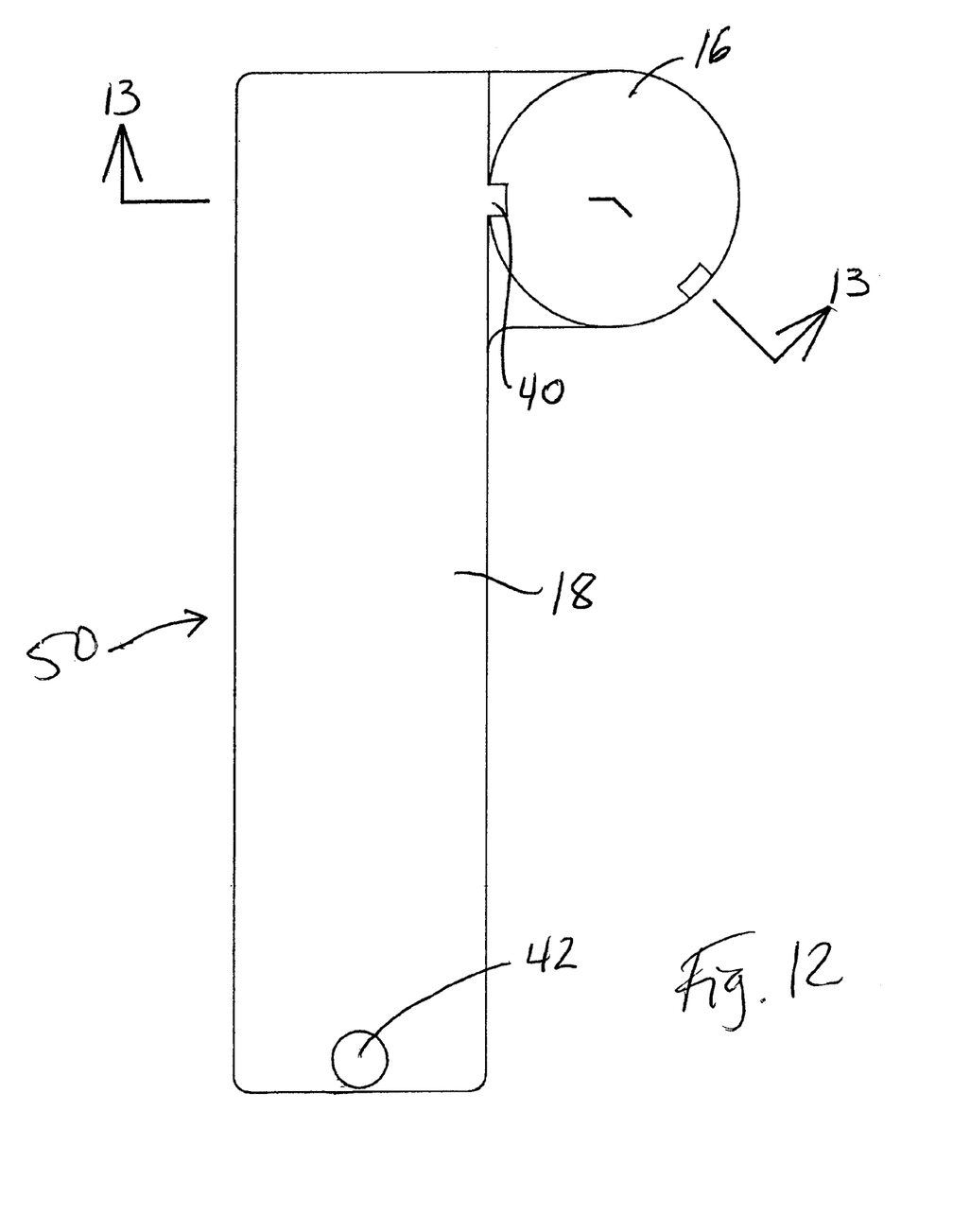
FIG. 12 is a top plan view of an upper section of the evacuation unit of FIG. 10, but without showing a cap of the reservoir and an inlet conduit of the pump.
Figure 13:
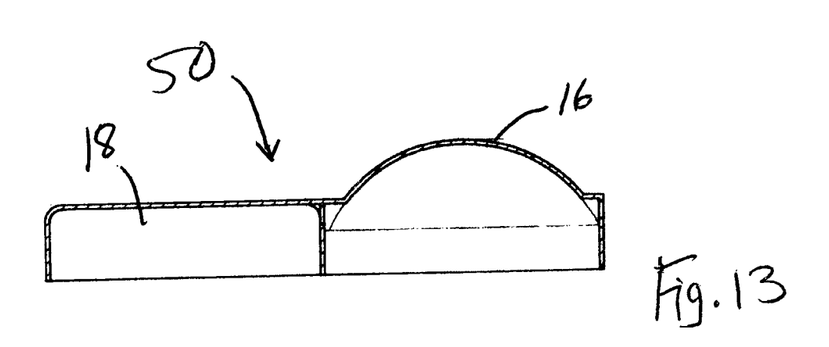
FIG. 13 is a horizontal cross-sectional view taken along line 13-13 in FIG. 12.
Figure 14:
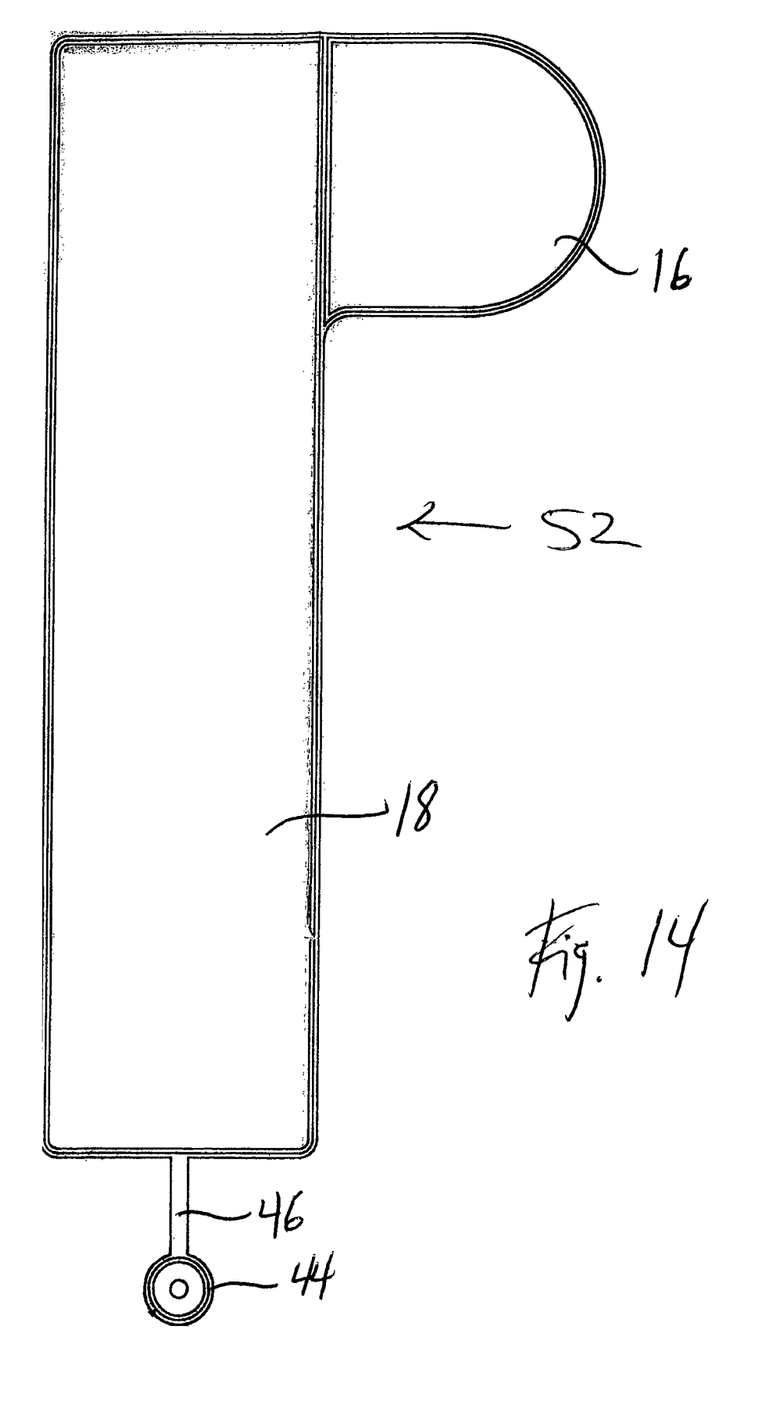
FIG. 14 is a top plan view of a lower section of the evacuation unit of FIG. 10.
Figure 15:
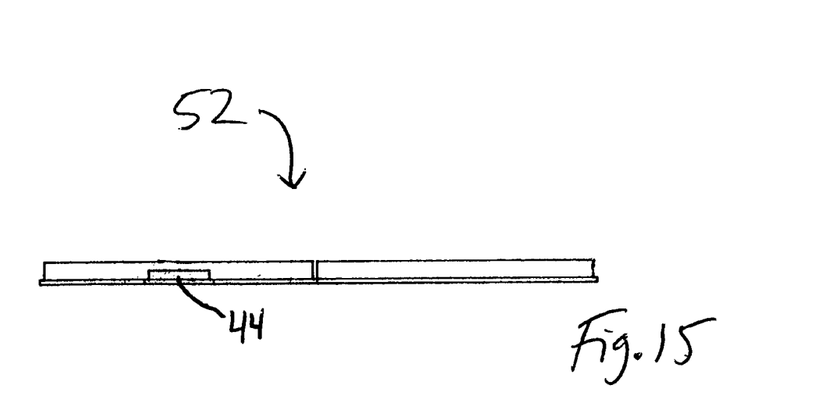
FIG. 15 is a side elevation view of FIG. 14.
Figure 16:
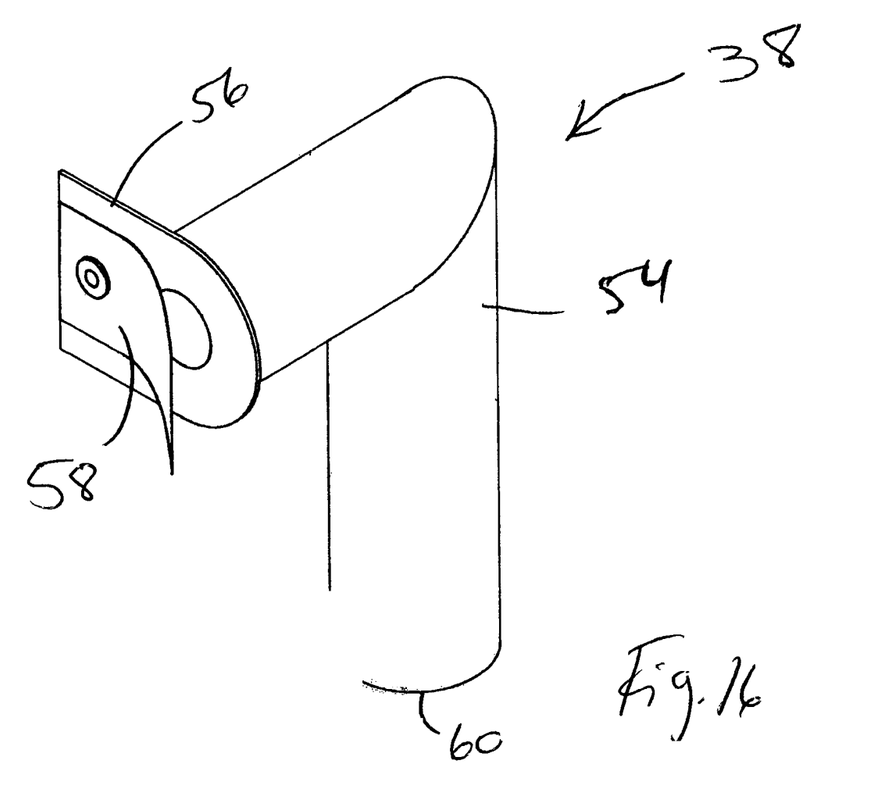
FIGS. 16 to 19 are perspective, front, side elevation and bottom plan views, respectively, of an inlet conduit of the evacuation unit.
Figure 17:
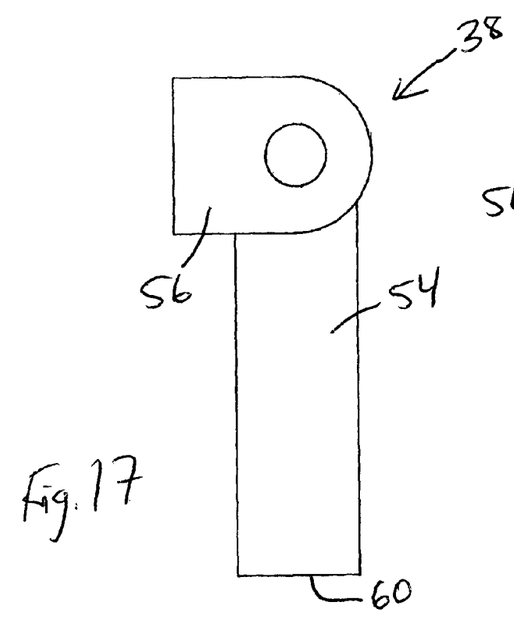
Figure 18:
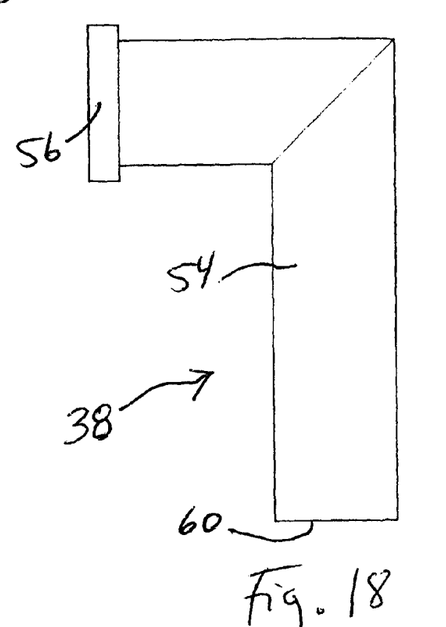
Figure 19:
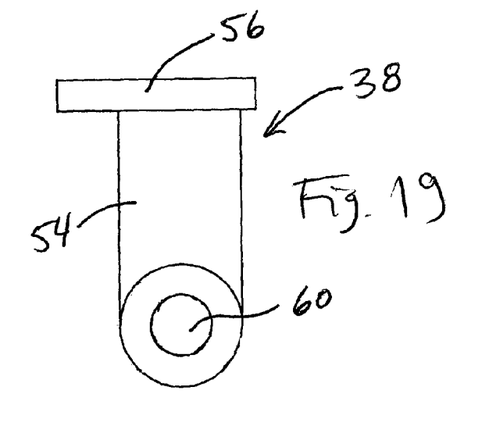

The evacuation unit 14 is inserted into a fitted cavity 37 (see FIG. 4) defined in the rear section 26 of the floor mat 10, as seen in FIG. 1. The reservoir 18 extends at a rearward end of the floor mat 10, within the peripheral raised edge 22. The evacuation unit 14 includes an upper section 50 (shown in isolation in FIGS. 12 and 13) and a lower section 52 (shown in isolation in FIGS. 14 and 15), which are sealed together. The pump 16, which is located adjacent the collecting area 36, includes an inlet conduit 38 that opens up in the collecting area 36. The inlet conduit 38, which is shown in isolation in FIGS. 16 and 19, includes an elbow-shaped tube 54, a plate 56 and a check valve 58, the latter being only illustrated in FIG. 16. A free end 60 of the tube 54 is positioned so as to open in the collecting area 36. The plate 56 connects the inlet conduit 38 of the pump 16, and the check valve 58 prevents water and particulates from flowing from the evacuation unit 14 back into the collecting area 36. The inlet conduit 38 can be pivoted with respect to the pump 16 to adjust the position of the free end 60 of the inlet conduit 38 in the collecting area 36.

An outlet of the pump 16, identified by reference numeral 40, is in fluid communication with the reservoir 18 so that the water and particulates in the collecting area 36 can be pumped by the pump 16 into the reservoir 18. The reservoir 18 is also provided with a discharge opening 42 (see FIG. 12), that is closed by a removable cap 44 held on by strap 46. The cap 44 has a vent 48.

The pump 16, as herein illustrated, can take the form of a foot-actuated pump, made up of a compressible chamber that is adapted to be repeatedly depressed so as to gradually pump the water and particulates through the inlet conduit 38 and out of the outlet 40 into the reservoir 18. The pump 16 can be operated by the user's left heel while sitting down in the vehicle.

Instead of being manually operated, the pump 16 can be electrically actuated. In such a case, the pump can be switched on manually or automatically via a sensor that triggers the pump once a certain level of water has accumulated in the collecting area 36. If the pump is electrical, it could be operated with the 12-volt circuit available in most vehicles, such as by connecting the pump to the 12-V cigarette lighter receptacle.

The evacuation unit 14 can be removed from the floor mat 10 so that the reservoir 18 can be emptied, when required. A sensor can be provided in the reservoir 18 to alert the user once a predetermined level has been reached in the reservoir 18, whereby the user can proceed to timely empty the reservoir 18.

As vehicles can be fitted with 2, 4 or even more floor mats (vehicle front and rear), a number of floor mats 10 can be provided, each of which is adapted for the floor area that it will occupy and will permit water and particulates that have accumulated therein to use a single evacuation unit. In such a case, a first floor mat of the type shown herein at 10 could be used along with other water-collecting floor mats exempt of any evacuation unit. Hoses could connect the water-collecting areas of these other floor mats to the evacuation unit of the first floor mat. It is also contemplated to use a decorative auxiliary mat 12 or one similar thereto in conjunction with each of these other water-collecting floor mats.

It is also contemplated to use a decorative mat, such as the present auxiliary mat 12 or one similar thereto, with a water-collecting floor mat, such as the present floor mat 10 or one similar thereto, and without necessarily including the pump and reservoir feature.

It is further contemplated to adapt the floor mat assembly A for use in environments other than motor vehicles. Indeed, the floor mat assembly A can be adapted for use in buildings, wherein those wearing boots and rubbers would place their footwear on the adapted floor mat assembly to permit drainage of water and particulates therein. Other uses include applications where it is desirable to drain substances from wetted articles and collect these substances.

Although the present invention has been described hereinabove by way of embodiments thereof, it may be modified, without departing from the nature and teachings of the subject invention as described herein.

The invention claimed is:

1. A floor mat assembly, comprising a floor mat and an evacuation unit, said floor mat being adapted to collect liquid-based substances, and said evacuation unit being adapted to pump at least some of the substances out of said floor mat, wherein said evacuation unit includes a pump and a reservoir, said pump and said reservoir being located on said floor mat, and said pump being adapted to pump at least some of the substances out of said collecting area and into said reservoir.

2. A floor mat assembly as defined in claim 1, wherein said floor mat defines a ribbed section with channels therebetween for directing the substances to a collecting area, said evacuation unit being adapted to pump at least some of the substances out of said collecting area.

3. A floor mat assembly as defined in claim 2, wherein there is also provided an auxiliary mat adapted to be positioned atop said floor mat.

4. A floor mat assembly as defined in claim 3, wherein said floor mat defines a sloped surface forming a bottom of said channels, said sloped surface being sloped downwardly towards said collecting area.

5. A floor mat assembly as defined in claim 4, wherein said pump is provided with an inlet conduit having an entry end thereof located in said collecting area.

6. A floor mat assembly as defined in claim 5, wherein said evacuation unit is adapted to be removed from said floor mat.

7. A floor mat assembly as defined in claim 6, wherein said pump is electrically operated.

8. A floor mat assembly as defined in claim 7, wherein a sensor is provided in said floor mat for triggering the operation of said pump once a certain level of substances has been reached in said floor mat.

9. A floor mat assembly as defined in claim 7, wherein said pump is manually operated.

10. A floor mat assembly as defined in claim 9, wherein a second sensor is provided for measuring a level of substances in said reservoir and issuing a signal once a certain level of substances has been reached in said reservoir.

11. A floor mat assembly as defined in claims 8, wherein a 12-volt source of a vehicle is used for powering said pump.

12. A floor mat assembly as defined in claim 11, wherein there are provided at least two floor mats, said pump being in fluid communication with each of said floor mats for pumping the substances of all said floor mats.

13. A floor mat assembly as defined in claim 12, wherein said pump is located on one of said floor mats and being in fluid communication with said one of said floor mats as well as with the other ones of said floor mats for pumping the substances of all said floor mats.

14. A floor mat assembly as defined in claim 13, wherein hoses are provided for connecting said pump to at least said other ones of said floor mats.

* * * * *